Patented Nov. 16, 1937

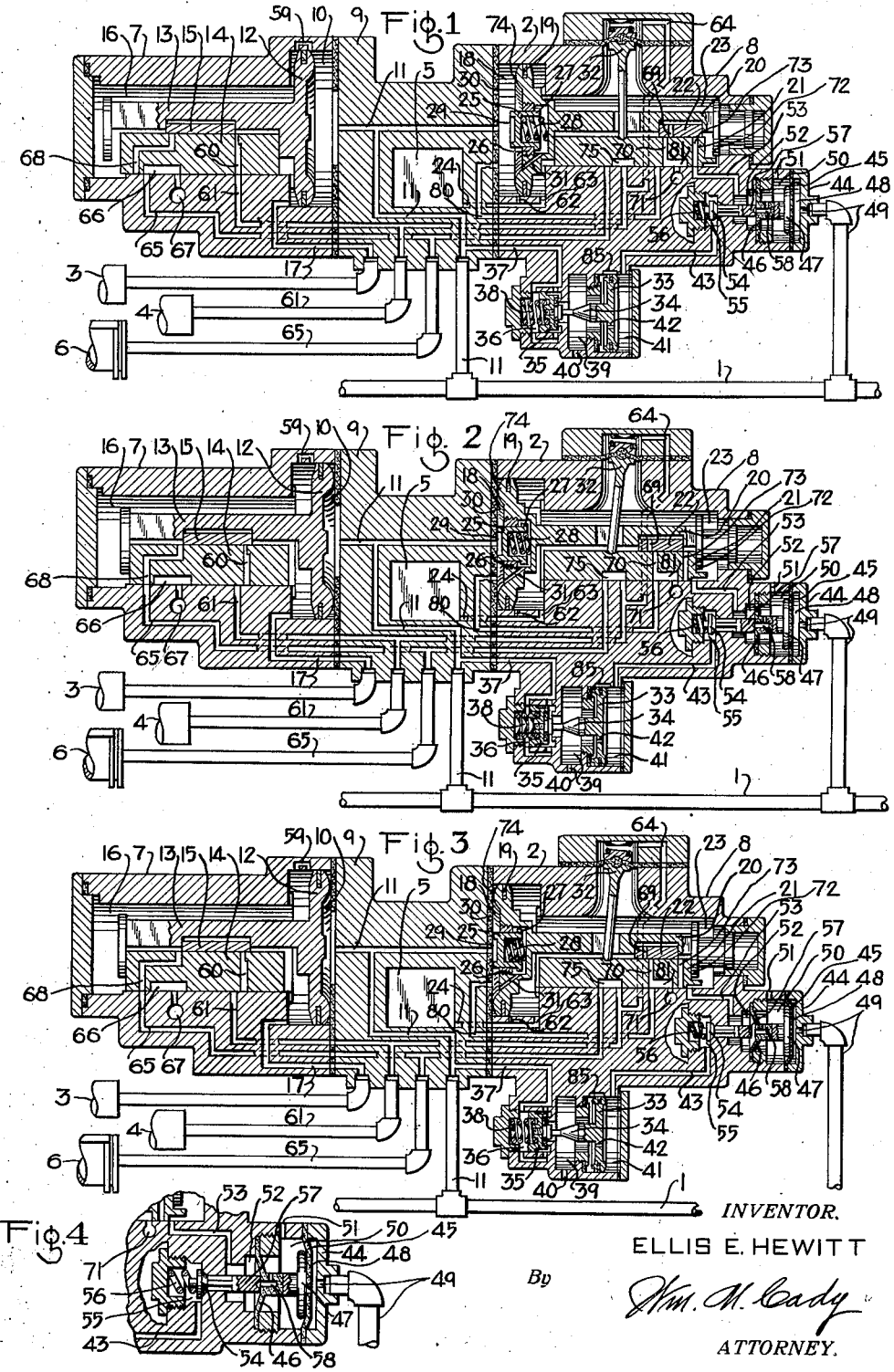

2,099,397

UNITED STATES PATENT OFFICE 2,099,397

FLUID PRESSURE BRAKE

Ellis E. Hewitt, Edgewood, Pa., assignor to The Westinghouse Air Brake Company, Wilmerding, Pa., a corporation of Pennsylvania Application March 5, 1936, Serial No. 67,261

21 Claims. (Cl. 303—37)

This invention relates to fluid pressure brake equipment and more particularly to that type of equipment disclosed in Clyde C. Farmer Patent No. 2,031,213, issued February 18, 1936.

In the equipment disclosed in this Farmer patent, the brake pipe pressure is reduced to substantially atmospheric pressure in effecting an emergency application of the brakes and in order to prevent undue delay in effecting the release of the brakes following an emergency application, means are provided for dumping back into the brake pipe fluid under pressure from the brake cylinder and auxiliary reservoir.

The principal object of the present invention is to provide means in a brake equipment of the type covered in the above mentioned patent for preventing undue delay in releasing the brakes after an emergency application, which means, instead of increasing brake pipe pressure as is the case in the equipment disclosed in the patent, is operative to prevent the brake pipe pressure from being reduced in effecting an emergency application of the brakes, to a degree lower than required to insure equalization of the auxiliary and emergency reservoir pressures into the brake cylinder, and which, at the same time, is adapted to prevent the retained brake pipe pressure from causing any undesired operation of the equipment when an application of the brakes is being effected.

Other objects and advantages will appear in the following more detailed description of the invention.

In the accompanying drawing, Fig. 1 is a diagrammatic view, mainly in section of a fluid pressure brake equipment embodying the invention, the several parts of the equipment being shown in release position; Fig. 2 is a similar view illustrating the equipment in emergency application position, the quick action vent valve being shown in brake pipe venting position; Fig. 3 is a diagrammatic view similar to that of Fig. 2 but showing the quick action vent valve closed and the quick action chamber being vented to the atmosphere independently of the quick action vent valve device; and Fig. 4 is a fragmentary diagrammatic view, mainly in section, illustrating the vent valve for the quick action chamber in closed position.

As shown the fluid pressure brake equipment may comprise a brake pipe 1, a brake controlling valve device 2, an auxiliary reservoir 3, an emergency reservoir 4, a quick action reservoir 5, and a brake cylinder 6.

The brake controlling valve device 2 may, with but a few exceptions hereinafter noted, be of substantially the same construction as the brake controlling valve device shown in the aforementioned Farmer Patent No. 2,031,213. However, since the present invention relates to the operation of the equipment to effect an emergency application of the brakes and the subsequent release of the brakes, the showing of the equipment has been simplified by omitting many details not necessary to a clear understanding of the present invention.

As shown the brake controlling valve device may comprise a triple valve device 7, an emergency valve device 8 and a pipe bracket 9 which is interposed between and carries the devices 7 and 8.

The triple valve device 7 may comprise a casing having a piston chamber 10 connected through a passage and pipe 11 to the brake pipe 1 and containing a piston 12 having a stem 13 adapted to actuate a main slide valve 14 and an auxiliary slide valve 15 contained in a chamber 16 which is connected through a passage and pipe 17 to the auxiliary reservoir 3.

The emergency valve device may comprise a casing having a piston chamber 18 connected through pipe and passage 11 to the brake pipe 1 and containing a piston 19 having a stem 20 adapted to actuate a main slide valve 21 and an auxiliary slide valve 22 contained in a chamber 23 which is connected through a passage 24 to the quick action reservoir 5.

The emergency piston is provided with a recess which extends inwardly from its outer face, which recess contains a valve member 25 which is slidably mounted in an annular stop member 26 which has screw-threaded connection with the piston. The inner end of the valve member 25 is provided with an annular stop shoulder 27 which is adapted to be engaged by the stop member 26 to limit outward movement of the valve member relative to the piston. Also contained in the recess in the piston and interposed between and operatively engaging the piston and valve member is a spring 28 which at all times tends to urge the valve member toward its outermost position. The outer end of the valve member is provided with an annular valve 29 which, when the emergency piston is moved to emergency position, will engage a gasket 30 interposed between the pipe bracket 9 and the casing of the emergency valve device 8, as will hereinafter more fully appear. The recess in the piston is constantly in communication with the piston chamber through a passage 31 with which the piston is provided.

The main slide valve 21 of the emergency valve device is adapted to be urged into close contact with the slide valve seat by fluid under pressure acting on the valve through the medium of a strut mechanism 32 operatively carried by the casing.

The emergency valve device also comprises a quick action vent valve mechanism comprising a piston 33 having a stem 34 adapted to control the operation of a vent valve 35 contained in a chamber 36 connected through a passage 37 to the brake pipe passage 11, said valve being normally maintained closed by the action of a spring 38 contained in valve chamber 36. At one side of the piston 33 is a chamber 39 which is connected through a passage 40 to the atmosphere, and at the other side of the piston is a chamber 41 which is connected through a restricted passage 42 in the piston to the chamber 39 and which is connected to a passage 43 leading from a control valve mechanism 44 which in the present embodiment of the invention is mounted in the casing of the emergency valve device and which constitutes a part of said device.

The control valve mechanism 44, as will hereinafter more fully appear, is provided for the purpose of cutting off the flow of fluid from the quick action chamber 23 of the emergency valve device to the quick action piston chamber 41 when, in effecting an emergency application of the brakes, the brake pipe pressure has been reduced to a predetermined degree, so as to permit the quick action vent valve to close and thereby retain the brake pipe fluid at substantially said predetermined pressure. The mechanism 44 is also for the purpose of continuing the reduction in quick action chamber pressure after the flow of fluid to the quick action piston chamber 41 is cut off.

The mechanism 44 may comprise spaced differential flexible diaphragms 45 and 46 which are mounted in the casing and operatively connected together by means of a follower member 47, the diaphragm 45 being of greater area than the diaphragm 46. At one side of the larger diaphragm 45, there is a chamber 48 which is connected through a passage and pipe 49 to the brake pipe 1, and between the diaphragms there is a chamber 50 which is connected through a passage 51 to the atmosphere. At the other side of the diaphragm 46 there is a chamber 52 which is connected to a passage 53 leading to the seat for the main slide valve 21 of the emergency valve device.

The flexible diaphragms 45 and 46 are adapted to control the operation of a control valve 54 contained in a valve chamber 55 which is connected through passage 43 to the quick action piston chamber 41. Contained in the chamber 55 is a spring 56 which, at all times, tends to urge the control valve 54 toward its seat.

The valve 54 is provided with a fluted stem which extends into the diaphragm chamber 52 and at its end is provided with an annular valve 57 which is adapted to engage the diaphragm 46 to cut off communication from the chamber 52 to a passage 58 which is provided in the diaphragm 46 and follower member 47 and which is connected to the chamber 50 between the diaphragms.

Initial charging of the equipment

In initially charging the equipment, fluid under pressure supplied to the brake pipe in the usual manner, flows through pipe and passage 11 to both the triple valve piston chamber 10 and emergency piston chamber 18, and through pipe and passage 58 to the diaphragm chamber 48 of the control valve mechanism 44.

Fluid under pressure flows from the triple valve piston chamber 10 through a feed port 59 to the triple valve slide valve chamber 16 and from thence flows through passage and pipe 17 to the auxiliary reservoir 3. Fluid also flows from the piston chamber 16 through a restricted port 60 in the triple valve main slide valve 14 and a passage and pipe 61 to the emergency reservoir 4.

From the emergency piston chamber 18, fluid under pressure flows through a feed port 62 and a passage 63 to the quick action reservoir 5 and emergency valve chamber 23.

Fluid under pressure supplied to the passage 61 leading to the emergency reservoir flows through a branch passage 64 to the strut mechanism 32 and acts on said mechanism to maintain the emergency main slide valve 21 in close contact with its seat.

When the brake pipe pressure and consequently the pressure of fluid in diaphragm chamber 48 of the control valve mechanism 44 has been increased sufficiently to overcome the opposing pressure of the spring 56, the diaphragm assembly will be shifted in a direction toward the left hand and as a result will unseat the valve 54 as shown in Fig. 1 of the drawing, thus establishing communication between the diaphragm chamber 52 and valve chamber 55. With the valve 54 unseated the spring 56 acts to maintain the valve 57 in engagement with the flexible diaphragm 46, thus closing communication from the diaphragm chamber 52 to the passage 58 which leads to the chamber 50 which chamber is connected to the atmosphere by way of port 51.

With the several parts of the equipment in release position as shown in Fig. 1, the brake cylinder 6 is connected to the atmosphere by way of a pipe and passage 65, a cavity 66 in the main slide valve 14 of the triple valve device, and the usual brake cylinder exhaust passage 67.

Service application of the brakes

To effect a service application of the brakes the brake pipe pressure is reduced at a service rate and upon such a reduction the several parts of the triple valve device 7 are caused to move in the usual manner to service position in which fluid under pressure is supplied from the auxiliary reservoir to the brake cylinder by way of a service port 68 in the main slide valve 14 and passage and pipe 65.

Upon a service rate of reduction in brake pipe pressure, the emergency piston 19 and auxiliary slide valve 22 move outwardly from their release position until such time as a port 69 in the auxiliary slide valve is opened to a port 70 in the main slide valve 21, at which time fluid under pressure flows from the valve chamber 23 and connected quick action reservoir 5 to the atmosphere at substantially a service rate, through said ports and an atmospheric passage 71. Since the rate of reduction in quick action chamber pressure is substantially the same as the rate of reduction in brake pipe pressure, the emergency piston and auxiliary slide valve will come to a stop before the main slide valve 21 is operatively engaged by the piston stem.

Release of the brakes following a service application

When it is desired to release the brakes, the brake pipe pressure is increased in the usual manner which causes the several parts of the brake controlling valve device to move to release position, in which position they are shown in Fig. 1. In this position the brake cylinder 6 is connected to the atmosphere and the charging communication between the auxiliary reservoir and emergency reservoir is reestablished, all of which will be readily understood from the description of the initial charging of the equipment.

Emergency application of the brakes

When it is desired to effect an emergency application the brake pipe pressure is reduced at an emergency rate and, upon such a rate of reduction in brake pipe pressure, the several parts of the triple valve device and emergency valve device are caused to move to their outermost or emergency application position, as shown in Fig. 2.

The emergency piston in its traverse toward emergency position causes the auxiliary slide valve 22 to be moved relative to the main slide valve 21 until such time as a shoulder 72 on the piston stem 20 engages the rear end of the main slide valve 21, when the continued outward movement of the piston causes both the auxiliary and main slide valves 22 and 21, respectively, to move in unison to emergency position.

The auxiliary slide valve 22 as it is moved relative to the main slide valve 21 uncovers a port 73 in the main slide valve which port is in registration with the passage 53. Fluid under pressure now flows from the emergency slide valve chamber 23 and connected quick action reservoir 5 to the piston chamber 41 of the quick action vent valve device by way of port 73, passage 53, diaphragm chamber 52, past the unseated valve 54, through valve chamber 55 and passage 43. Fluid under pressure thus supplied to the piston chamber 41 causes the quick action piston 33 to move inwardly and thereby unseat the vent valve 35 against the opposing pressure of the spring 38. With the vent valve unseated, fluid under pressure is vented from the brake pipe by way of passage 37, vent valve chamber 36, past the unseated vent valve, through chamber 39 and passage 40.

After the port 73 has been uncovered by the auxiliary slide valve 22 as just described, the main slide valve is caused to move with the auxiliary slide valve to emergency position. As the main slide valve is thus moved, the port 73 is moved out of communication with the passage 53 and at substantially the same time as this occurs the main slide valve uncovers the passage 53, so that there will be no material interruption in the flow of fluid from the emergency valve chamber 23 to the quick action piston chamber 41.

Just before the emergency piston 19 reaches its emergency position, the valve 29, carried by the piston, engages the gasket 30 and thereby cuts off communication between the brake pipe passage 11 and the emergency piston chamber 18, after which the piston moves relatively to the valve until such time as the piston is brought to a stop by the engagement of the outermost face surface 74 of the piston with the gasket 30. After the valve 29 has been moved into air-tight engagement with the gasket 30, the cavity 75 in the main slide valve 21 connects the emergency reservoir passage 61 to the brake cylinder passage 65. At substantially the same time as the passages 61 and 65 are connected together a tail cavity 81 of the port 70 in the main slide valve 21 connects a restricted passage 80, leading from the emergency piston chamber 18, to the atmospheric passage 71. With this latter communication established, fluid under pressure which might otherwise be bottled up in chamber 18 is permitted to flow to the atmosphere.

With the several parts of the brake controlling valve device in emergency position, fluid under pressure flows from both the auxiliary reservoir 2 and emergency reservoir 3 to the brake cylinder, the flow of fluid from the auxiliary reservoir being by way of pipe and passage 17, triple valve slide valve chamber 16, service port 68, and passage and pipe 65, and the flow of fluid from the emergency reservoir being by way of pipe and passage 61, a cavity 75 in the emergency main slide valve 21 and passage and pipe 65.

It will here be understood that the area of that portion of the flexible diaphragm 45 of the control valve device 44, over which fluid at brake pipe pressure in chamber 48 acts, is such that the diaphragm will act to maintain the control valve 54 unseated against the opposing pressure of the spring 56 acting on the valve 54 and fluid under pressure in diaphragm chamber 52 acting on the smaller diaphragm 46, until such time as the brake pipe pressure has been reduced sufficiently to provide for the substantial equalization of the auxiliary reservoir and emergency reservoir pressures into the brake cylinder 6, at which time the spring 56 and the fluid under pressure in diaphragm chamber 52 causes the diaphragm assembly to be shifted in a direction toward the right hand, permitting the valve 54 to seat, the valve when seated cutting off the flow of fluid from the emergency slide valve chamber 23 to the piston chamber 41 of the equalizing discharge valve device. When the valve 54 is thus seated, fluid under pressure in diaphragm chamber 52 causes the diaphragm assembly to move toward the right to the position in which it is shown in Fig. 3, in which position, the diaphragm 46 will be out of engagement with the valve 57, the disengagement of the diaphragm from the valve 57 occurring at substantially the same time as the valve 54 is seated.

With the valve 54 seated the pressure of fluid in piston chamber 41 of the quick action vent valve device will be quickly reduced, by the flow of fluid therefrom to the atmosphere by way of the port 42 in the quick action piston 33, sufficiently to permit the spring 38 to act to seat the vent valve 35 and thereby cut off the quick action flow of fluid from the brake pipe to the atmosphere. The flow area of the port 42 is small, but due to the small volume of the chamber 41, passage 43 and valve chamber 55, the reduction in the pressure of fluid in chamber 41 sufficient to permit the spring 38 to seat the vent valve will be quickly effected. From this it will be seen that the reduction in brake pipe pressure will cease very quickly after the control valve 54 seats.

When the diaphragm 46 moves out of engagement with the valve 57 fluid under pressure from the emergency valve chamber 23 and connected quick action reservoir 5 continues to reduce by the flow of fluid to the atmosphere by way of passage 53, diaphragm chamber 52, restricted passage 58 in the follower member 47 of the diaphragm assembly chamber 50 and passage 51.

Now when, due to the flow of fluid from the quick action chamber to the atmosphere, the quick action chamber has been reduced to a chosen predetermined degree which will be lower than the retained brake pipe pressure, the retained brake pipe pressure acting on the diaphragm 45 causes the diaphragm assembly to move toward the left into engagement with the valve 57, as shown in Fig. 4. This cuts off the further flow of fluid from the quick action chamber to the atmosphere, and since the diaphragm assembly is now balanced, the assembly will come to a stop and the valve 54 will remain seated.

*Release of the brakes following an emergency application*

When it is desired to release the brakes following an emergency application the brake pipe pressure is increased in the usual manner, causing the several parts of the triple valve and emergency valve devices to move to release position.

When in initiating the release of the brakes the brake pipe pressure is increased sufficiently to cause the valve 29 carried by the emergency piston to move out of seating engagement with the gasket 30 fluid under pressure flows to the emergency piston chamber 18 and quickly increases the chamber pressure to that of the brake pipe. Since the pressure of fluid in the valve chamber 23 is lower than brake pipe pressure, fluid under pressure in chamber 18 and acting on a relatively large area of the face of the emergency piston 19 causes the piston and thereby the main and auxiliary slide valves 21 and 22, respectively, to move to release position.

When valve 29 is unseated and fluid under pressure is thereby permitted to flow from the brake pipe to piston chamber 18, as just described, the atmospheric communication from the chamber by way of restricted passage 80, tail cavity in the emergency main slide valve 21 and passage 71 will be open so that fluid may flow from the chamber 18 through this communication to the atmosphere until such time as the main slide valve is moved a sufficient distance in its traverse to release position to cut off communication from the passage 80 to the cavity 81. It will here be understood that the passage 80 is so restricted that the flow of fluid therethrough will be at such a slow rate that it will not materially affect the rate of increase in chamber 18 and consequently will not materially delay the movement of the piston toward release position.

The emergency piston 19 in its traverse to release position shifts the auxiliary slide valve 22 a limited distance relative to the main slide valve 21 and covers the port 73 in the main slide valve, thereby cutting off communication from the valve chamber 23 and the port, after which the piston shifts both valves in unison to release position in which the port 73 is in registration with the passage 53 leading to the control valve mechanism 44.

With the emergency piston 19 in release position, fluid under pressure flows from the piston chamber 18 through port 62 and passage 63 to the emergency valve chamber 23 and connected quick action reservoir 5.

Now when the brake pipe pressure in chamber 48 of the control valve mechanism 44 and acting on the large diaphragm 45 has been increased sufficiently to overcome the opposing combined pressures of fluid in chamber 52 and spring 56 acting on the small diaphragm 46, the diaphragm assembly will by the action of the larger diaphragm be shifted in a direction toward the left hand and in its movement will unseat the control valve 54. It will here be understood that the diaphragm assembly will not function to unseat the valve 54 until the brake pipe pressure exceeds that required to insure the movement of the several parts of the emergency valve device to release position. When the valve 54 is thus unseated, fluid under pressure flows from diaphragm chamber 52 by way of valve chamber 55 and passage 43 to vent valve piston chamber 41. The volume of chamber 41 is so much greater than that of diaphragm chamber 52 that the flow of fluid from chamber 52 to chamber 41 will not increase the pressure of chamber 41 sufficiently to cause the piston 33 to operate to unseat the vent valve 35. Fluid under pressure thus supplied to the chamber 41 flows to the atmosphere by way of a leakage groove 85 extending from one side of the piston 33 to the other side and by way of the atmospheric chamber 39.

When the brake pipe pressure in the triple valve piston chamber 10 has been increased sufficiently to overcome the reduced auxiliary reservoir pressure in valve chamber 16, the triple valve piston 12 and thereby the main and auxiliary slide valves 14 and 15, respectively, are shifted to release position in which fluid under pressure is vented from the brake cylinder 6 by way of pipe and passage 65, cavity 66 in the main slide valve 14 and passage 67.

With the triple valve piston in release position fluid under pressure flows from the piston chamber 10 through feed groove 59 to valve chamber 16 and from the valve chamber flows through passage and pipe 17 to the auxiliary reservoir 2 and through port 60 in the main slide valve 14 and passage and pipe 61 to the emergency reservoir 4.

It will be apparent from the foregoing description that in effecting an emergency application of the brakes, the control valve mechanism 44 functions to prevent the brake pipe pressure from being reduced below that required to insure a full emergency application of the brakes and also functions to limit the reduction in quick action chamber pressure. Since the reductions in brake pipe and quick action chamber pressures are each limited, the recharge of the equipment to effect a release of the brakes following an emergency application will be greatly accelerated over which would be the case in an equipment not embodying the mechanism 44 or means for back dumping fluid from the brake cylinder and auxiliary reservoir to the brake pipe.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, in combination, a brake pipe, a brake controlling valve device operated upon an emergency reduction in brake pipe pressure to effect an emergency application of the brakes, valve means operative by fluid under pressure supplied by said brake controlling valve device in effecting an emergency application of the brakes to establish a communication through which fluid under pressure is locally vented from the brake pipe, and means constantly subject to brake pipe pressure responsive to a reduction in brake pipe pressure of sufficient magnitude to insure a full emergency application of the brakes for effecting the operation of said valve means to close said communication.

2. In a fluid pressure brake equipment, in combination, a brake pipe, a brake controlling valve device operated upon an emergency reduction in brake pipe pressure to effect an emergency application of the brakes, means operative by fluid under pressure supplied by said brake controlling valve device in effecting an emergency application of the brakes to establish a communication through which fluid under pressure is locally vented from the brake pipe, and means subject to the opposing pressures of the brake pipe and fluid being supplied to the first mentioned means and operated upon a predetermined reduction in brake pipe pressure to effect the operation of the first mentioned means to close said communication.

3. In a fluid pressure brake equipment, in combination, a brake pipe, a brake controlling valve device operated upon an emergency reduction in brake pipe pressure to effect an emergency application of the brakes, means operative by fluid under pressure supplied by said brake controlling valve device in effecting an emergency application of the brakes to establish a communication through which fluid under pressure is locally vented from the brake pipe, and means subject to the opposing pressures of the brake pipe and fluid being supplied to the first mentioned means and operated upon a reduction in brake pipe pressure of sufficient magnitude to insure a full emergency application of the brakes for effecting the operation of the first mentioned means to close said communication and thereby limit the local reduction in brake pipe pressure.

4. In a fluid pressure brake equipment, in combination, a brake pipe, a brake controlling valve device operated upon an emergency reduction in brake pipe pressure to effect an emergency application of the brakes, means operative by fluid under pressure supplied by said brake controlling valve device in effecting an emergency application of the brakes to locally vent fluid under pressure from the brake pipe and operative upon a reduction in the pressure of fluid supplied thereto for cutting off the local flow of fluid from the brake pipe, and means operated upon a predetermined reduction in brake pipe pressure for effecting the operation of said means to cut off the local flow of fluid from the brake pipe.

5. In a fluid pressure brake equipment, in combination, a brake pipe, a brake controlling valve device operated upon an emergency reduction in brake pipe pressure to effect an emergency application of the brakes, means operative by fluid under pressure supplied by said brake controlling valve device in effecting an emergency application of the brakes to locally vent fluid under pressure from the brake pipe and operative upon a reduction in the pressure of fluid supplied thereto for cutting off the local flow of fluid from the brake pipe, and means subject to the opposing pressures of the brake pipe and fluid being supplied by said brake controlling valve device to the first mentioned means and operated upon a predetermined reduction in brake pipe pressure for effecting the operation of the first mentioned means to cut off the local venting of fluid from the brake pipe and thereby limit the local reduction in brake pipe pressure.

6. In a fluid pressure brake equipment, in combination, a brake pipe, a brake controlling valve device operated upon an emergency reduction in brake pipe pressure to effect an emergency application of the brakes, means operative by fluid under pressure supplied by said brake controlling valve device in effecting an emergency application of the brakes to locally vent fluid under pressure from the brake pipe and operative upon a reduction in the pressure of fluid supplied thereto for cutting off the local flow of fluid from the brake pipe, means operated upon a predetermined reduction in brake pipe pressure for cutting off the supply of fluid under pressure from the brake controlling valve device to the first mentioned means, and means functioning when the supply of fluid is cut off from the first mentioned means for reducing the pressure of fluid acting on the first mentioned means.

7. In a fluid pressure brake equipment, in combination, a brake pipe, a chamber normally charged with fluid under pressure, valve means subject to the opposing pressures of the brake pipe and chamber operative upon an emergency reduction in brake pipe pressure to effect an application of the brakes and to vent fluid under pressure from said chamber to effect a reduction in the pressure of fluid in said chamber, a vent valve mechanism operative by fluid under pressure vented from said chamber for venting fluid under pressure from the brake pipe, and means operative upon a predetermined reduction in brake pipe pressure to cut off the flow of fluid to the vent valve mechanism and to establish another communication through which fluid under pressure is vented from said chamber and operative upon a predetermined reduction in the chamber pressure for cutting off the flow of fluid from the chamber, said vent valve device being operative to cut off the flow of fluid from the brake pipe when said means is in position cutting off the flow of fluid to the vent valve device.

8. In a fluid pressure brake, in combination, a brake pipe, a chamber normally charged with fluid under pressure, a vent valve device operative by fluid under pressure to vent fluid under pressure from the brake pipe, a brake controlling valve device subject to the opposing pressures of the brake pipe and chamber and operative upon an emergency reduction in brake pipe pressure to supply fluid under pressure to effect an emergency application of the brakes and to supply fluid under pressure from said chamber to effect the operation of said vent valve device to vent fluid under pressure from the brake pipe, and means operative upon a predetermined reduction in brake pipe pressure for effecting the operation of said vent valve device to cut off the flow of fluid from the brake pipe and for then venting fluid under pressure from said chamber to the atmosphere and operative upon a predetermined reduction in chamber pressure for cutting off the flow of fluid from said chamber to the atmosphere.

9. In a fluid pressure brake, in combination, a brake pipe, a chamber normally charged with fluid under pressure, a vent valve device operative by fluid under pressure to vent fluid under pressure from the brake pipe, a brake controlling valve device subject to the opposing pressures of the brake pipe and chamber and operative upon an emergency reduction in brake pipe pressure to supply fluid under pressure to effect an emergency application of the brakes and to supply fluid under pressure from said chamber to effect the operation of said vent valve device to vent fluid under pressure from the brake pipe, and means operative upon a predetermined reduction in brake pipe pressure for effecting the operation of said vent valve device to cut off the flow of fluid from the brake pipe and operative to vent fluid under pressure from said chamber to the atmosphere and to cut off the flow of fluid from the chamber to the atmosphere upon a predetermined reduction in chamber pressure.

10. In a fluid pressure brake, in combination, a brake pipe, an equalizing valve device having a piston chamber normally connected to the brake pipe and comprising valve means and a piston in said chamber operated upon a reduction in brake pipe pressure for operating said valve means to a brake application position, means operative by said piston upon movement of said piston toward brake application position for cutting off communication from the brake pipe to said chamber, and means for venting fluid under pressure from said chamber after the communication between the brake pipe and chamber is cut off.

11. In a fluid pressure brake, in combination, a brake pipe, an equalizing valve device having a piston chamber normally connected to the brake pipe and comprising valve means and a piston in said chamber operated upon a reduction in brake pipe pressure for operating said valve means to a brake application position, means operative by said piston upon movement of said piston toward brake application position for cutting off communication from the brake pipe to said chamber, and means included in said valve means establishing a communication through which fluid under pressure is vented from said chamber in the brake application position of the valve means.

12. In a fluid pressure brake, in combination, a brake pipe, an equalizing valve device having a piston chamber normally connected to the brake pipe and comprising valve means and a piston in said chamber operated upon a reduction in brake pipe pressure for operating said valve means to a brake application position, means carried by the piston and operative upon movement of said piston toward brake application position for cutting off communication from the brake pipe to said chamber, and means for venting fluid under pressure from said chamber after the communication between the brake pipe and chamber is cut off.

13. In a fluid pressure brake, in combination, a brake pipe, an equalizing valve device having a piston chamber normally connected to the brake pipe and comprising valve means and a piston in said chamber operated upon a reduction in brake pipe pressure for operating said valve means to a brake application position, means operative by said piston upon movement of said piston toward brake application position for cutting off communication from the brake pipe to said chamber, and means for reducing the pressure of said chamber to atmospheric pressure after the communication between the brake pipe and chamber is cut off.

14. In a fluid pressure brake, in combination, a brake pipe, an emergency valve mechanism having a piston chamber normally connected to the brake pipe and also having a quick action chamber normally charged with fluid under pressure and comprising valve means and a piston operated upon an emergency reduction in brake pipe pressure to operate said valve means to an emergency brake application position for effecting an emergency application of the brakes for effecting a local reduction in brake pipe pressure and for reducing quick action chamber pressure, means operative upon a predetermined reduction in brake pipe pressure for controlling the operation of the valve mechanism to limit the local reduction in brake pipe pressure, means operative upon movement of said piston toward brake application position for cutting off communication between the brake pipe and piston chamber, and means operating in the brake application position of the emergency valve mechanism for reducing the pressure of fluid in said piston chamber.

15. In a fluid pressure brake, in combination, a brake pipe, an emergency valve mechanism having a piston chamber normally connected to the brake pipe and also having a quick action chamber normally charged with fluid under pressure and comprising valve means and a piston operated upon an emergency reduction in brake pipe pressure to operate said valve means to an emergency brake application position for effecting an emergency application of the brakes for effecting a local reduction in brake pipe pressure and for reducing quick action chamber pressure, means operative upon a predetermined reduction in brake pipe pressure for controlling the operation of the valve mechanism to limit the local reduction in brake pipe pressure, means operative upon movement of said piston toward brake application position for cutting off communication between the brake pipe and piston chamber, and means operative after the communication between the brake pipe and piston chamber is cut off for reducing the pressure of fluid in said piston chamber.

16. In a fluid pressure brake, in combination, a brake pipe, an emergency valve mechanism having a piston chamber normally connected to the brake pipe and also having a quick action chamber normally charged with fluid under pressure and comprising valve means and a piston operated upon an emergency reduction in brake pipe pressure to operate said valve means to an emergency brake application position for effecting an emergency application of the brakes for effecting a local reduction in brake pipe pressure and for reducing quick action chamber pressure, means operative upon a predetermined reduction in brake pipe pressure for controlling the operation of the valve mechanism to limit the local reduction in brake pipe pressure, means operative upon movement of said piston toward brake application position for cutting off communication between the brake pipe and piston chamber, and means included in said valve means establishing in the emergency application position of the valve means a communication through which fluid under pressure is vented from said piston chamber.

17. In a fluid pressure brake, in combination, a brake pipe, an equalizing valve device having a piston chamber normally connected to the brake pipe and comprising valve means and a piston in said chamber operated upon a reduction in brake pipe pressure for operating said valve means to a brake application position, means operative upon movement of said piston toward brake application position for cutting off communication from the brake pipe to said chamber, and means for venting fluid under pressure from said chamber after the communication between the brake pipe and chamber is cut off, the first mentioned means being responsive to a predetermined increase in brake pipe pressure to admit fluid under pressure from the brake pipe to said piston chamber, and means for restricting the rate of flow of fluid from said piston chamber by way of the second mentioned means.

18. In a fluid pressure brake, in combination, a brake pipe, a quick action vent valve device operative to vent fluid under pressure from the brake pipe, an emergency valve device having a piston chamber normally connected to the brake pipe and also having a quick action chamber normally charged with fluid under pressure and comprising valve means and a piston operated upon an emergency reduction in brake pipe pressure for operating said valve means to effect an emergency application of the brakes, to supply fluid under pressure from said quick action chamber to effect the operation of said vent valve device to vent fluid under pressure from the brake pipe, a normally open valve past which fluid supplied to the quick action vent valve device flows, means operative upon a predetermined reduction in brake pipe pressure to close said valve to effect the operation of said quick action vent valve device to cut off the local venting of fluid from the brake pipe, a valve means operative upon movement of said piston toward emergency application position for cutting off communication between the brake pipe and piston chamber, means adapted in the emergency position of said piston for reducing the pressure of fluid in said piston chamber, said valve means being operative to admit fluid under pressure from the brake pipe to said chamber upon an increase in brake pipe pressure, and means for maintaining said valve closed until the brake pipe pressure acting on said means exceeds that required to move said piston to a brake releasing position.

19. In a fluid pressure brake equipment, in combination, a brake pipe, a vent valve device operative upon an increase in fluid pressure for venting fluid from the brake pipe, a brake controlling valve device operative upon an emergency reduction in brake pipe pressure for effecting an emergency application of the brakes and for supplying fluid under pressure to operate said vent valve device, and means operated upon a reduction in brake pipe pressure to a predetermined degree for cutting off communication through which fluid under pressure is supplied by said brake controlling valve device to said vent valve device.

20. In a fluid pressure brake equipment, in combination, a brake pipe, a vent valve device operative upon an increase in fluid pressure for venting fluid from the brake pipe and having means for permitting the slow venting of fluid supplied thereto, a brake controlling valve device operative upon an emergency reduction in brake pipe pressure for effecting an emergency application of the brakes and for supplying fluid under pressure to operate said vent valve device, and means operated upon a reduction in brake pipe pressure to a predetermined degree for cutting off communication through which fluid under pressure is supplied by said brake controlling valve device to said vent valve device.

21. In a fluid pressure brake equipment, in combination, a brake pipe, a vent valve device operative upon an increase in fluid pressure for venting fluid from the brake pipe and upon a cutting off of the supply of fluid under pressure thereto to close the communication through which fluid is vented from the brake pipe, a brake controlling valve device operative upon an emergency reduction in brake pipe pressure for effecting an emergency application of the brakes and for supplying fluid under pressure to operate said vent valve device, and means operated upon a reduction in brake pipe pressure to a predetermined degree for cutting off communication through which fluid under pressure is supplied by said brake controlling valve device to said vent valve device.

ELLIS E. HEWITT.